United States Patent
Sato

(10) Patent No.: US 7,299,271 B2
(45) Date of Patent: Nov. 20, 2007

(54) SYSTEM FOR AUTOMATICALLY DOWNLOADING CONTENT FROM A SERVER TO A HOME SYSTEM BASED ON USER'S COMMAND FROM A REMOTE TERMINAL

(75) Inventor: Shinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 670 days.

(21) Appl. No.: 10/314,227

(22) Filed: Dec. 9, 2002

(65) Prior Publication Data

US 2003/0110214 A1    Jun. 12, 2003

(30) Foreign Application Priority Data

Dec. 11, 2001  (JP) .............................. 2001-377593

(51) Int. Cl.
    *G06F 15/16*    (2006.01)
(52) U.S. Cl. ...................................... 709/219; 709/218
(58) Field of Classification Search ................ 709/219, 709/218, 225, 203, 18, 19; 370/386; 725/39; 386/46; 707/203
    See application file for complete search history.

(56) References Cited

U.S. PATENT DOCUMENTS

| | | | |
|---|---|---|---|
| 6,826,581 B2 * | 11/2004 | Moslander et al. | ......... 707/203 |
| 6,885,809 B1 * | 4/2005 | Asada | ........................ 386/46 |
| 2002/0031120 A1 * | 3/2002 | Rakib | ........................ 370/386 |
| 2002/0040475 A1 * | 4/2002 | Yap et al. | ..................... 725/39 |
| 2002/0100044 A1 * | 7/2002 | Daniels | ....................... 725/39 |
| 2002/0198991 A1 * | 12/2002 | Gopalakrishnan et al. | .. 709/225 |
| 2003/0009537 A1 * | 1/2003 | Wang | ........................ 709/219 |

FOREIGN PATENT DOCUMENTS

| | | |
|---|---|---|
| JP | 7-143170 | 6/1995 |
| JP | 2000-259532 | 9/2000 |
| JP | 2001-331426 | 11/2001 |

\* cited by examiner

*Primary Examiner*—Le Hien Luu
(74) *Attorney, Agent, or Firm*—Young & Thompson

(57) ABSTRACT

A content obtaining system automatically downloads desired content from a communication network to a home system based on a command from a remote terminal. The content obtaining system includes a communication network, a content server which stores content, a terminal which can access the content server via the communication network and which transmits a command to the communication network under a user's operation, and a home system which receives the command via the communication network and automatically downloads content stored in the content server and designated by the command sent via the communication network.

22 Claims, 4 Drawing Sheets

SYSTEM FOR AUTOMATICALLY DOWNLOADING CONTENT FROM A SERVER TO A HOME SYSTEM BASED ON USER'S COMMAND FROM A REMOTE TERMINAL

BACKGROUND OF THE INVENTION

The present invention relates to a content obtaining system, and, more particularly, to a content obtaining system for downloading content automatically to a home system based on a command from a remote terminal.

Hitherto, when a user downloads desired content from a server on the Internet, the downloaded data is directly stored in the user's personal computer (PC) via the Internet.

Recently, there are mobile terminals such as a mobile telephone and a personal digital assistant (a PDA) that can access the Internet. By the mobile terminals, the user can browse homepages, download desired content and store the downloaded data in the user's mobile terminal via the Internet.

It should be noted that, in conventional system, the downloaded content can be stored only in the terminal which the user operates.

Consequently, there is a possibility that a mobile terminal cannot download all the desired content because of its limited storage capacity, a time constraints, and the like. That is, the storage capacity of a mobile terminal is normally smaller than that of a PC. Therefore, all the desired data cannot be stored in the mobile terminal if the desired content is large. Moreover, the data transfer speed of a communication line which the mobile terminal uses is normally lower than a communication line which a PC uses, for example, DSL, LAN, and the like. Therefore, more time for storing data is required.

SUMMARY OF THE INVENTION

The present invention has an object to provide a content obtaining system for automatically downloading desired content from a communication network such as the Internet to a home system, based on a command from a remote terminal.

According to one embodiment of the present invention, the content obtaining system includes a communication network, a content server which stores content, a terminal which can access the content server via the communication network and which transmits a command to the communication network under a user's operation, and a home system which receives the command via the communication network and automatically downloads content stored in the content server and designated by the command via the communication network.

BRIEF DESCRIPTION OF THE DRAWINGS

These and other objects, features and advantages of the invention will become more apparent from the following detailed description when taken in conjunction with the accompanying drawings, in which.

DESCRIPTION OF THE PREFERRED EMBODIMENTS

The present invention will be now explained in detail below with reference to the accompanying drawings.

Figure 1:
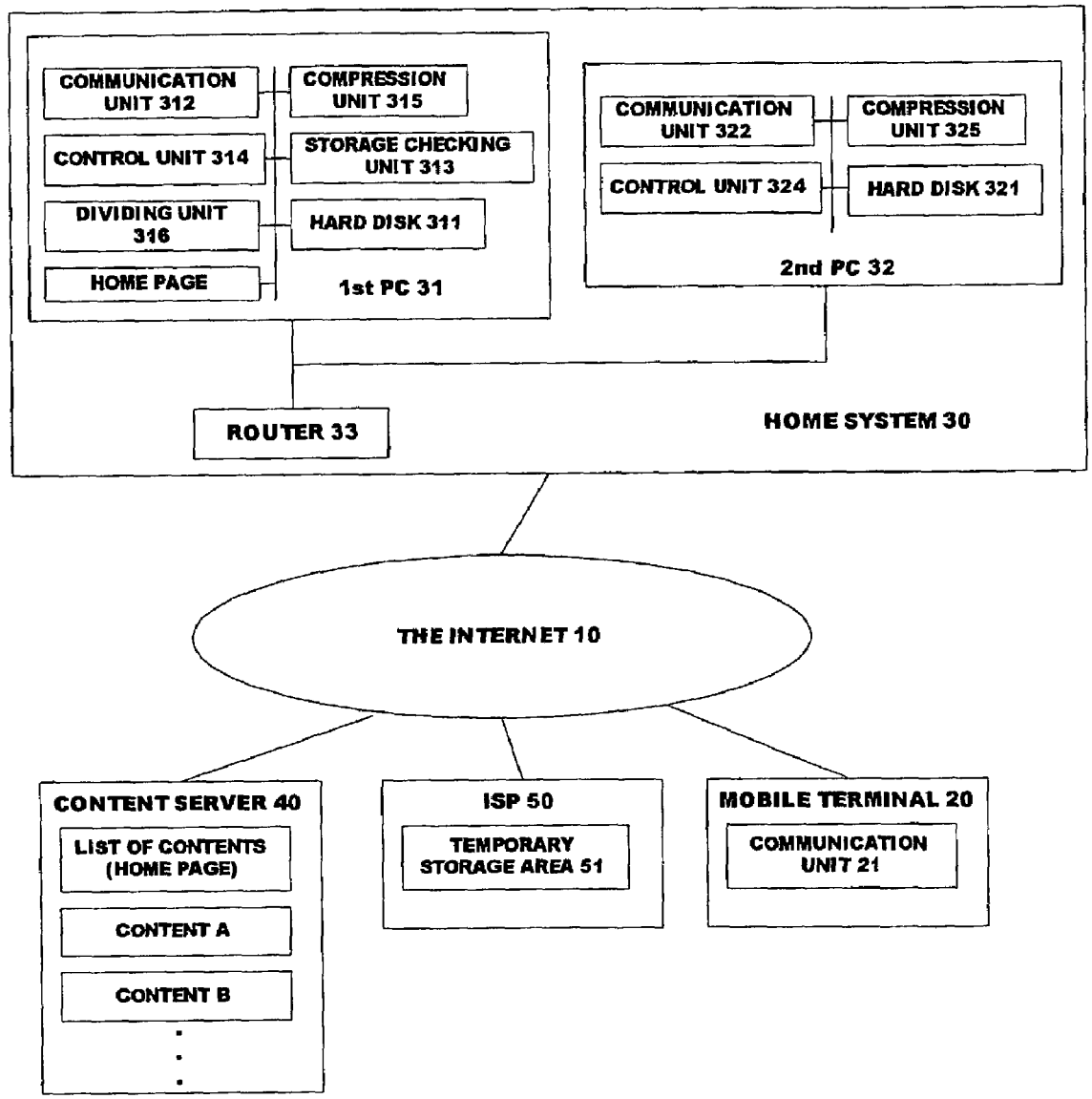
FIG. 1 is a diagram showing the structure of a content obtaining system according to preferred embodiments of the present invention.

Referring to FIG. 1, a content obtaining system includes the Internet 10, a mobile terminal 20 such as a PDA or a mobile phone, a home system 30, a content server 40, and an Internet service provider system (an "ISP") 50.

The mobile terminal 20 is connected to the Internet 10 by radio signal and can communicate with the home system 30, the content server 40, and the ISP 50 via the Internet 10. The mobile terminal 20 can browse a homepage (web page) on the Internet 10 by a communication unit 21. Alternatively, the communication between the mobile terminal 20 and the Internet 10 may be connected not only by radio but also by wiring.

The home system 30 in this embodiment includes a first PC 31, a second PC 32, and a router 33. The first PC 31 and the second PC 32 are connected to the Internet 10 via the router 33. The first PC includes a hard disk 311, a communication unit 312, a storage checking unit 313, a control unit 314, a compression unit 315 and a dividing unit 316. The control unit 314 controls each unit in the first PC 31. The second PC includes a hard disk 321, a communication unit 322, a control unit 324 and a compression unit 325. The control unit 324 controls each unit in the second PC.

The content server 40 stores home pages and various content such as document files, music files, still image files (e.g. photographs and illustrations) and moving images (e.g. movies). A user refers to the homepage which carries, for example, a list of the content.

The ISP 50 provides access services for permitting the user's terminal (the mobile terminal 20, the first PC 31 and the second PC 32) to access the Internet 10 and storage services for temporarily storage information described later. In the case of the access services, logically, the ISP 50 exists between the Internet 10 and the user's terminal. Referring to FIG. 1, attention is paid to only the function of the ISP 50 for the storage services and the user's terminals are directly connected to the Internet 10. The ISP 50 includes a temporary storage area 51 for temporarily storage information from each user or addressed to each user.

In above-described structure, in the content obtaining system, the home system 30 automatically downloads content on the content server 40 based on a command from the mobile terminal 20 operated by the user. The detailed operation of embodiments of the content obtaining system will now be described.

Figure 2:
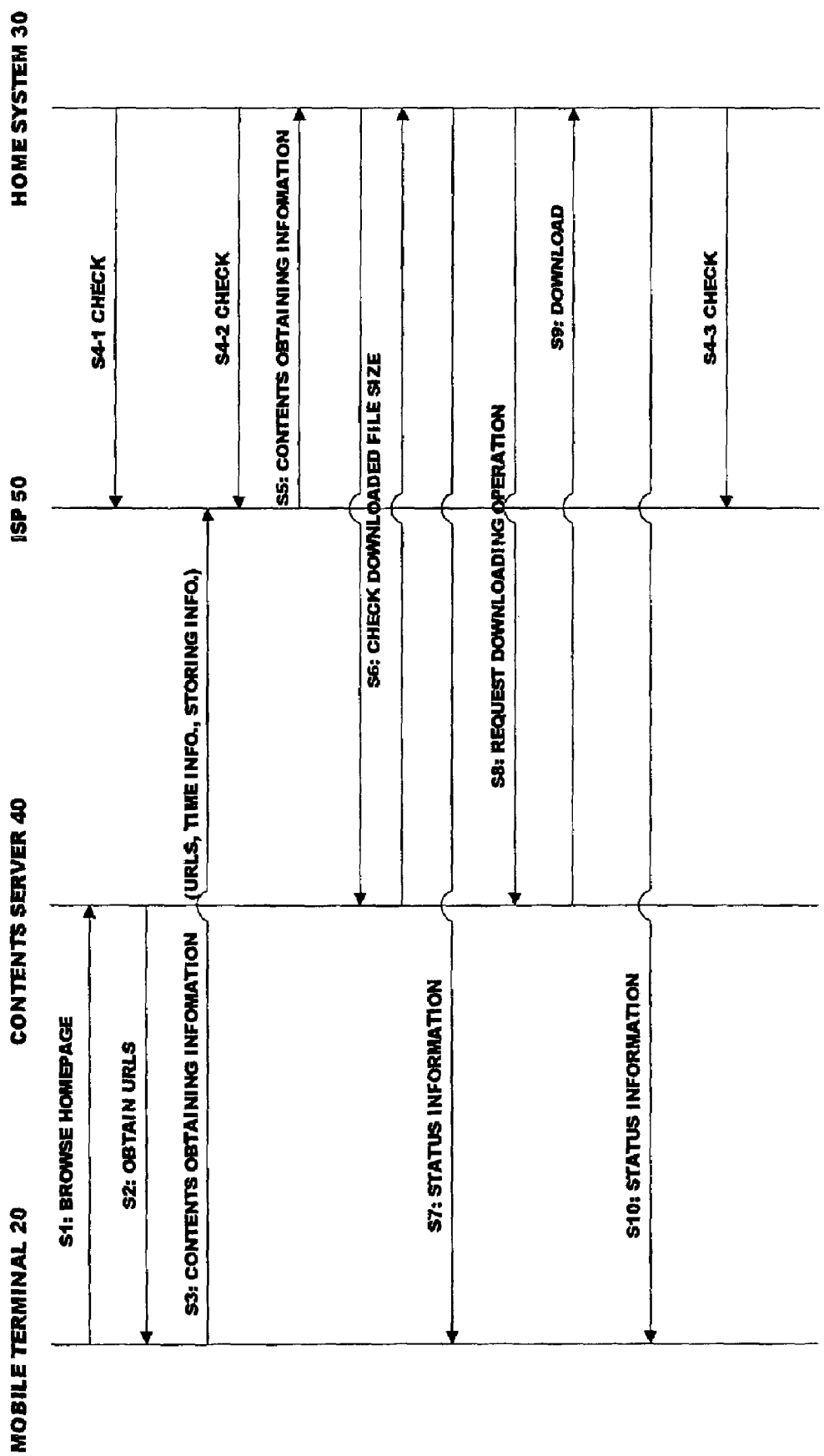
FIG. 2 is a sequence diagram showing the operation of a content obtaining system according to a first embodiment of the present invention.

In operation of the first embodiment of the content obtaining system, referring to FIG. 1 and FIG. 2, the user browses the homepage of the content server 40 from the mobile terminal via the Internet 10, out of his home or office (step S1). If the user finds content that he wishes to view later at the home system 30 during the browsing operation, the mobile terminal obtains a Uniform Resource Locator (URL) of the homepage and the content from the content server 40 via the Internet 10 under a user's operation (step S2).

Under the user's operation, the mobile terminal 20 sends "content obtain" information to the ISP 50 via the Internet (step S3). The ISP 50 stores the received information in the temporary storage area 51 corresponding to the user who sends the information.

The content obtain information includes the URLs of the homepage and the content, time information, and storage information. The time information is for designating whether the download is started immediately or the download is started at a designated time.

The storage information is for designating "the hard disk 311 incorporated in the first PC 31 (e.g., C drive, D drive, ...)" or "the hard disk 321 incorporated in the second PC 32 (e.g., C drive, D drive, ...)". By the storage information, the user can store the desired content in different disks depending on content genres. Thus, the adjustment which will be performed later is easy. Moreover, since the user can designate the hard disk with a large free capacity, when a file size of the downloaded content is large, the possibility that the content cannot be stored during the downloading operation is prevented.

The first PC 31 is periodically connected to the ISP 50 and checks to see whether the content obtain information exists in the temporary storage area of the ISP 50 by a communication unit 312 (steps $S4_1$, $S4_2$, $S4_3$, ...). If the first PC 31 detects that the content obtain information exists, the first PC 31 receives the content obtain information (step S5).

Next, the first PC 31 connects to the content server 40 based on the URL in the content obtain information and obtains information on file size of the content designated by the content obtain information, via the communication unit 312 (step S6). That is, in the case of using, for example, a Hyper Text Transfer Protocol (HTTP) as a protocol, the first PC 31 can recognize in advance and obtain the file size of the content.

Next, the first PC 31 obtains information on a first disk capacity including "current capacity value of the hard disk 311", "free capacity value of the hard disk 311", and "alarm information indicating the shortage of the capacity of the hard disk 311" by a storage checking unit 313. The PC 31 checks whether the second PC 32 is running, via the communication unit 312. If the second PC 32 is not running, the first PC 31 turns the second PC 32 on, via the communication unit 312. The first PC 31 obtains the information on the second disk capacity including the "current capacity value of the hard disk 321", the "free capacity value of the hard disk 321", and the "alarm information indicating the shortage of the capacity of the hard disk 321" via the storage checking unit 313 and the communication unit 312.

Next, the communication unit 312 of the first PC 31 transmits to the mobile terminal 20 by, e.g., an email, the above-obtained file size information, the information on the first disk capacity, and the information on the second disk capacity, as "status information" indicating the current status of the home system 30 (step S7). Thus, the user of the mobile terminal 20 can check in advance whether his designated content can be stored in the home system 30. If the content can be stored, the user feels safe.

In case the homepage of the content server 40 displays the file size of the content, the user can know the file size of the content when the homepage is browsed from the mobile terminal 20. Therefore, the above-mentioned processing step S6 (for checking the downloaded file size) can be omitted. In this case, in the processing for transmitting the status information in step S7, the information on the first and second disk capacities except for the file size information is transmitted to the mobile terminal 20 as the status information.

Next, the control unit 314 of the first PC 31 checks whether the download is commence without delay, based on the time information included in the content obtain information. If it is instructed that the operation for downloading the content is to be promptly started, the first PC 31 accesses the content server 40 based on the content obtain information, and requests the operation for downloading the content via the communication unit 312 (step S8). Thus, the designated content is downloaded from the content server 40 and is stored in the hard disk which is designated by the storage information included in the content obtain information.

In the case of storage, the free capacity value included in the above-obtained first or second disk capacity information is compared with the file size of the downloaded content. As a result, if the content cannot be stored in the designated storage destination, the content is automatically compressed by the compression unit 315.

The compressing operation is performed by thinning data or by changing a compression ratio. The thinning operation is performed, for example, by changing a moving picture comprising an image having 30 frames per second to a moving picture comprising an image having 15 frames per second. When the content for downloading and browsing includes a video image such a TV commercial image, the thinning operation is performed, for example, by omitting the TV commercial image. Further, when the content for downloading and browsing includes a video image such as a concert, the thinning operation is performed, for example, by omitting a video image of a break time of the concert.

The compression ratio is changed by downscaling for reducing the image size. Downscaling is a compression method in which a video image comprising, e.g., 720×480 pixels is converted into a video image comprising 320×240 pixels. The compression ratio may be changed by trans-coding for converting an encoding method. For example, an MPEG (Motion Picture Except Group) 2 having an arbitrary bit rate for converting MPEG2 data into MPEG4 data is converted into MPEG2 data having another bit rate (that is, the compression ratio is changed) or the like. Incidentally, the trans-coding method can use various methods, other than the above-mentioned methods. The most simple method is a method whereby target data is temporarily decoded and is encoded again by using another bit rate and another compression method.

As mentioned above, in the case of a limitation for the number of downloading and browsing times, that is, when only one operation for downloading and browsing, e.g., live play, is permitted, and when the content must promptly be downloaded because the time is too short to adjust the hard disk having term-limited content, the user can obtain the desired content without fail by compressing and storing the downloaded content.

Although the downloaded content is compressed and stored in the hard disk in the above-mentioned structure, the file which has already been stored in the storage destination can automatically be compressed. The compressing of the file enables the expansion of the capacity of the hard disk. Further, both the downloaded content and the file which has already been stored in the storage destination can be compressed. The content is automatically compressed upon downloading operation and the user can designate whether the content is automatically compressed from the mobile terminal 20. In this case, the user sends information for instructing the compression, and that information is included in the content obtain information from the mobile terminal 20. With the above-mentioned structure, when the user knows that the downloaded content cannot be stored in the hard disk by viewing the status information sent from the home system 30 from the mobile terminal 20, the user can instruct that the content is compressed and stored again. Therefore, as compared with the automatic compressing operation, compression can be stopped when downloading picture quality due to the compression would be unacceptable.

After completing the downloading operation in step S9, subsequently, the first PC 31 sends the file size information of the downloaded content, the first disk capacity information, and the second disk capacity information, as the status information indicating the current status of the home system 30, to the mobile terminal 20 by, e.g., an email (step S10). Thus, the user of the mobile terminal 20 can check whether his designated content is downloaded to the home system 30 and can check the file size of the content. Further, the user can determine whether another content can be downloaded by viewing the first disk capacity information and the second disk capacity information.

After completing the processing for sending the status information in step S10 to the mobile terminal 20, the first PC 31 may disconnect from the Internet 10. By the above-mentioned operation, the user can view in detail later the content which cannot be viewed away from home.

If the content obtain information indicates that the content should be downloaded at a later designated time, the first PC 31 sends only the status information to the mobile terminal 20 (step S7). Thereafter, the first PC 31 disconnects from the Internet 10. Later, the first PC 31 again accesses the Internet 10 at the time designated by the time information, and downloads the content which is designated by the above-mentioned sequence. When the downloading operation is completed, the first PC 31 disconnects from the Internet 10.

With the above-mentioned structure, the user can select a time frame that is convenient for the user such as a time frame in which traffic of the Internet 10 is not heavy, and/or a time frame in which the access charge is cheap, and can download the content. By sending the content obtain information, the user can know the status of the home system 30 at the time. Therefore, the user can designate a different hard disk where the downloaded content will be stored and can change the designation of the compression with time allowance.

As mentioned above, in the content obtaining system according to the first embodiment of the present invention, when the user is not at home, he can nevertheless download the desired content via the Internet to the PC in the user's home at any desired time.

The first PC 31 may access the Internet 10 only for checking whether the ISP 50 has content obtain information, and if so, for downloading the content. Therefore, the access charge is cheap and the first PC 31 does not need a security function for preventing the danger caused by continuous Internet access. Alternatively, the first PC 31 can be set up with continuous Internet access. In this case, the above-mentioned access and disconnection to the Internet 10 are not performed and therefore, preferably, the first PC 31 or the router 33 has a security function.

Figure 3:
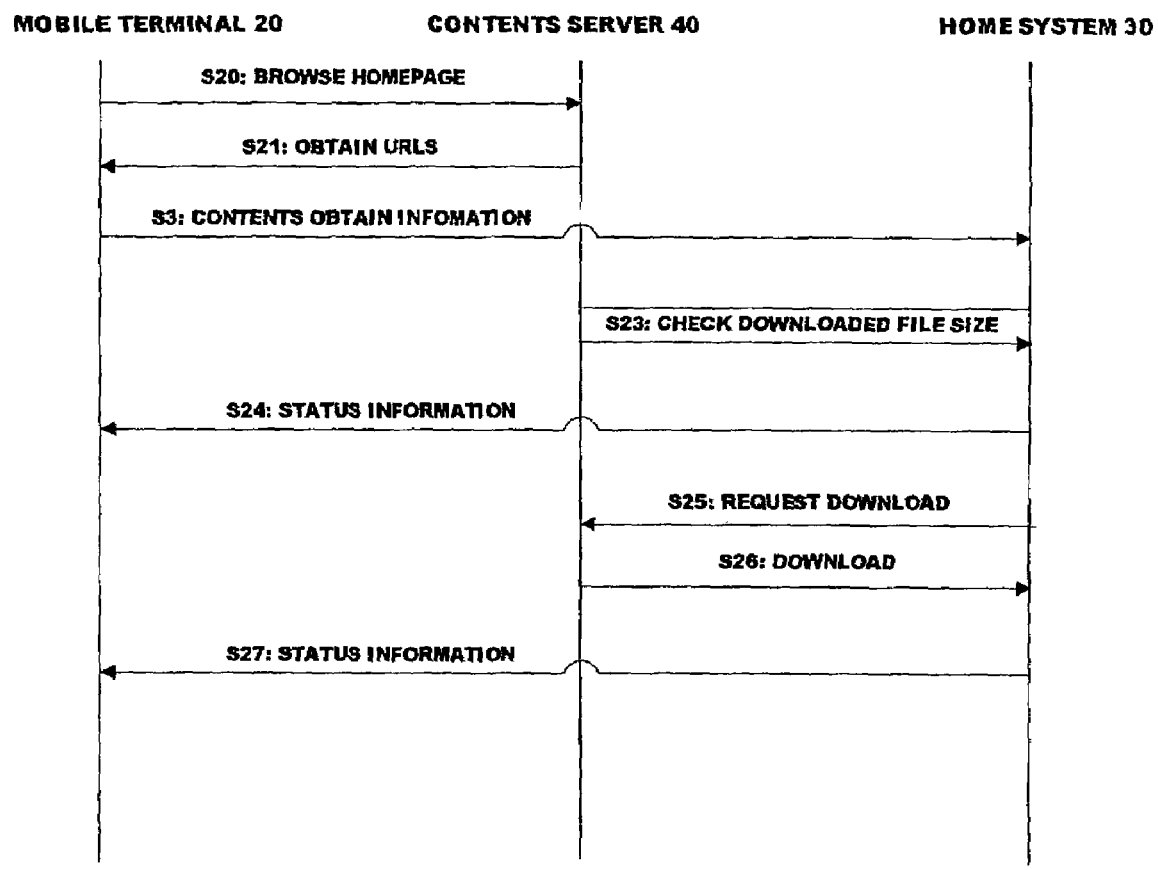
FIG. 3 is a sequence diagram showing the operation of a content obtaining system according to a second embodiment of the present invention.

The content obtaining system according to the first embodiment can be modified with a structure in which the mobile PC 20 can be instructed that the content is downloaded directly to the home system 30, not via the ISP 50. Hereinbelow, a description is given of the operation of the content obtaining system according to the modification of the first embodiment (a second embodiment) with reference to FIG. 1 and FIG. 3.

The user browses the homepage on the content server 40 out of the home or office via the Internet 10 from the mobile terminal 20 (step S20). If the content to be viewed in detail later is provided in the homepage during the browsing operation, the mobile terminal 20 obtains the URL address of the homepage and the desired content via the Internet 10 from the content server 40 (step S21).

On the other hand, upon external access, the router 33 in the home system 30 previously sets the access which is routed to the first PC 31. Therefore, the mobile terminal 20 can directly access the first personal computer 31 via the Internet 10.

The mobile terminal 20 which obtains the URL sends the content obtain information to the first PC 31 via the Internet 10 (step S22). The operation for sending the content obtain information is performed as follows. That is, an access method from the mobile terminal 20 to the first PC 31 is established by browsing the homepage provided on the first PC 31 by the mobile terminal 20.

The homepage on the first PC 31 is browsed on the mobile terminal 20 and the homepage includes a URL address describing column, a content designating column, a download start designating column, and a storage destination designating column. The user inputs necessary indexes in these columns by operating a key of the mobile terminal 20. Further, the homepage includes a sending button and the designation of the sending button from the mobile terminal 20 causes the transmission of the information inputted to the columns to the first personal computer 31. Alternatively, the content obtain information can be formed in advance on the mobile terminal 20 and can be sent, similarly to the case according to the first embodiment.

The first PC 31 accesses the content server 40 which is designated by the URL in the content obtain information and obtains the file size information of the content (step S23). Subsequently, the first PC 31 obtains the first disk capacity information of the hard disk incorporated therein and the second disk capacity information of the hard disk incorporated in the second PC 32. A free capacity and the like can be displayed in realtime by using a Common Gateway Interface (CGI) or an Active Server Pages (ASP) for the homepage on the first PC 31. Thus, the mobile terminal 20 can obtain the first and second disk capacities by the access to the homepage on the first personal computer 31.

Hereinbelow, similarly to the first embodiment, the first PC 31 sends to the mobile terminal 20 by an email, the file size information, the first disk capacity information, and the second disk capacity information, as the "status information" indicating the current status of the home system 20 (step S24).

When the time information included in the content obtain information indicates that the downloading operation should be started promptly, the first PC 31 requests the operation for downloading the content designated by the content obtain information (step S25). Thus, the content is downloaded and is stored in the storage destination designated by the storage information in the content obtain information (step S26). In the case of storage, if the content cannot be stored in the designated storage destination, the file which has already been stored in the content or/and storage destination is automatically compressed. The file compression enables the expansion of the capacity of the storage destination. Alternatively or in addition, the user can designate whether the compression should be performed from the mobile terminal 20.

After completing the downloading operation in step S26, next, the first PC 31 sends to the mobile terminal 20 by an email, information indicating the end of the downloading operation, the file size information of the downloaded content, the first disk capacity information, and the second disk capacity information, as the status information indicating the current status of the home system 30 (step S27). After completing the transmission, the first personal computer 31 disconnects from the Internet 10. Thus, the user can view content that cannot be viewed in detail away from the home or office.

On the other hand, if it is instructed by the content obtain information that the downloading operation should be started at the designated time, the first PC 31 only sends the status information to the mobile terminal 20 (step S24). Thereafter, the first personal computer 31 disconnects from the Internet 10. The first PC 31 accesses the Internet 10 at the time designated by the time information, and downloads the content. After completing the downloading operation, the first PC 31 disconnects from the Internet 10.

Thus, the user can download content to a home system 30 instead of the mobile terminal 20. For example, the user can select a time frame that is convenient for the user such as a time frame in which the Internet 10 is not heavy and a time frame in which access charge is cheap, and can download the content.

As mentioned above, in the content obtaining system according to the second embodiment, advantageously, the first PC 31 can be accessed from the mobile terminal 20 without using the ISP 50. It will be noted that, in the content obtaining system according to the second embodiment, the first PC 31 needs continuous access to the Internet 10. Therefore, in the content obtaining system according to the second embodiment, the first PC 31 can be accessed externally and directly. Thus, preferably, the router 33 has a security function.

According to the first and second embodiments, a description is given of the operation in which the PC 31 accesses the Internet 10 via the router 33. However, the operation, in which the second PC 32 or both the first PC 32 and the second PC 32 access the Internet 10 via the router 33, is the same as the above-mentioned operation.

Next, according to a third embodiment of the present invention, a plurality of personal computers distributes and stores downloaded content.

In the content obtaining system according to the third embodiment, the operation of the first PC 31 and the second PC 32 in the home system 30 is different from that according to the first embodiment. According to the third embodiment, the compression is not performed when the downloaded content is stored.

In the above-mentioned content obtaining system according to the first and second embodiments, as described above with reference to FIGS. 2 and 3, the user browses the homepage from the mobile terminal 20 and sends the content obtain information to the first PC 31 via the ISP 50 or directly. Thus, the first PC 31 downloads the content designated by the content obtain information via the Internet 10 from the content server 40.

Figure 4:
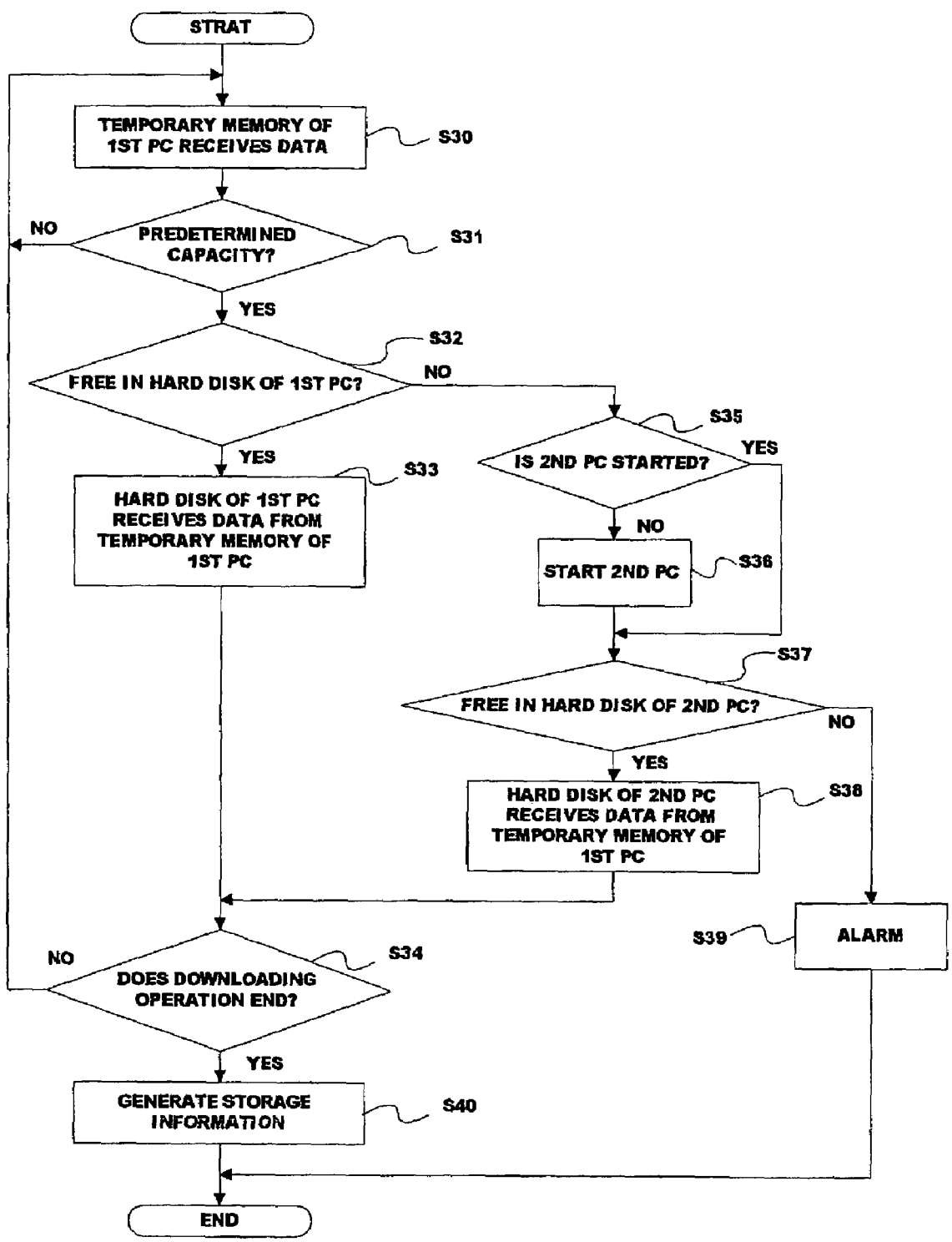
FIG. 4 is a flowchart showing the operation of a content obtaining system according to a third embodiment of the present invention.

Hereinbelow, a description is given of the operation of the first PC 31 and the second PC 32 upon storing the content downloaded to the home system 30 from the content server 40 with reference to a flowchart shown in FIG. 4.

The content is downloaded to the home system 30 from the content server 40 in accordance with a predetermined communication protocol. The downloading operation is started. Then, the first PC 31 displays reception data on a display, and simultaneously and sequentially stores the reception data in a temporary memory provided in the first PC 31 (step S30). The reception data may be displayed on the display of the second PC 32. In this case, it is confirmed in advance by the same sequence in steps S35 and S36, which will be described later, whether power of the second PC 32 is ON. The reception data may be displayed on both the first PC 31 and the second PC 32.

Next, the first PC 31 checks whether the data temporarily stored in the memory reaches a predetermined capacity (step S31). Herein, a storage capacity unit of the hard disk is used as the predetermined capacity. The storage capacity of the hard disk is the remaining size when the data is written to the hard disk once. If it is determined in step S31 that the data does not reach the predetermined capacity, the sequence returns step S30 whereupon the reception data is repeatedly temporarily stored.

If it is determined in step S31 in the repeating processing in steps S30 and S31 that the data reaches the predetermined capacity, next, it is checked whether there is a free capacity for storing the data which is temporarily stored in the hard disk of the first PC 31 (step S32). This is performed for purpose of determining that there is no capacity, when the free capacity of the hard disk is 10% of the entire capacity or less, or when the free capacity of the hard disk is less than a preset value (e.g., 100 MB).

If it is determined in step S32 that the hard disk of the first PC 31 has a free capacity, the data which is temporarily stored in the memory is stored in the hard disk (step S33).

Next, the first PC 31 checks whether the downloading operation has ended (step S34). This is performed by checking whether an end code is present in the downloaded content. If it is determined in step S34 that the downloading operation has not ended, the sequence returns to step S30. Then, the above-mentioned operation is repeated again.

If the first PC 31 determines in step S32 in the repeating processing that there is no free capacity in the hard disk, next, the first PC 31 checks whether the second PC 32 is started (step S35) This is performed by checking whether a response to a predetermined command is returned from the second PC 32 to the first PC 31.

If the first PC 31 determines in step S35 that the second PC 32 is not started, the first PC 31 starts the second PC 32 (step S36). The starting operation is performed by sending a command for instructing the on-operation of the power to the second PC 32 from the first personal computer 31. If the first PC determines in step S35 that the second PC 32 is started, the processing in step S36 is skipped.

The first PC 31 checks whether the second PC 32 has a free capacity for storing the data which is temporarily stored in the first PC 31 (step S37). This is performed similarly to the above-mentioned processing in step S32. If the first PC 31 determines in step S37 that the hard disk of the second PC 32 has the free capacity, next, the data which is temporarily stored in the memory of the first PC 31 is sent to the hard disk of the second PC 32 in accordance with a preset condition (step S38) Thereafter, the sequence branches to step S34.

Preferably, in the above-mentioned processing, in the case where the downloaded content is a file having a well-known structure, e.g., an MPEG file, the downloaded content is divided in accordance with the structure, and is distributed and stored into the hard disk of the first PC 31 and the hard disk of the second PC 32 by the dividing unit 316. The MPEG file is divided before a sequence header thereof or by a GOP unit. Thus, an MPEG moving picture can be read intact, despite the file thereof having been divided. As mentioned above, the file is stored by the storage capacity unit of the hard disk as mentioned above. The above division is performed by the storage capacity unit of the hard disk.

If it is determined in step S37 that the hard disk of the second personal computer 32 has no free capacity, an alarm is generated by the first PC 31 (step S39). In this case, the downloading operation is canceled upon generating the alarm and a series of processing ends.

If it is determined in step S34 in the repeating processing in steps S30 to S38 that the downloading operation ends, the storage information is subsequently generated and stored (step S40). That is, the first PC 31 generates an information management file which stores the downloaded content and data on the storage destination thereof, and stores the generated information management file in a predetermined folder of the first PC 31.

Specifically, when the downloaded data is stored only in the hard disk 311 of the first PC 31, the information management file includes an original file name of the downloaded content, a name of the first PC 31 as the storage destination, a file name on the first PC 31, a file name and a file size.

On the other hand, the downloaded data is divided and stored into the hard disk 311 of the first PC 31 and the hard disk 322 of the second PC 32, the information management file includes the original file name of the downloaded content, the name of the first PC 31 as the storage destination, the folder name on the first personal computer 31, the file name, the file size, a name of the second PC 32, a folder name on the second PC 32, a file name, and a file size.

Therefore, the user refers to the information management file stored in the first PC 13, thereby knowing the storage place of the downloaded content. When the downloaded data is stored only in the hard disk 311 of the first PC 31, the user can directly view the content. When the downloaded data is divided and stored in the hard disk 311 of the first PC 31 and the hard disk 321 of the second PC 32, the user can view the downloaded content by using an application program for viewing a plurality of files as one file and an application program for combining a plurality of files to one file.

As mentioned above, in the content obtaining system according to the third embodiment of the present invention, when the free capacity of the hard disk of one PC is low, the content is stored in the hard disk of another PC and therefore the downloading operation is not stopped. As a result, the user can store the desired content from the Internet 10 in the user's PC without fail.

According to the third embodiment, the downloaded content is divided according to the storage capacity unit of the hard disk. However, in the case of the MPEG file, the downloaded content can be divided just before the sequence header or by the GOP unit as an editing unit. The second and subsequent divided files can individually be viewed (read) after the above-mentioned division, despite the divided file.

In the case of using an HTTP as a protocol, the file size can be known before transferring the data. Thus, prior to the start operation of the data transfer, the free capacity of the hard disk is compared with the size of the downloaded file. If the free capacity of the hard disk 311 of the first PC 31 is smaller than the file size but the free capacity of the hard disk 321 of the second PC 32 is larger than the file size, the data can be stored in the hard disk of the second PC 32 starting from the first data.

In this case, the sum of the free capacity of the hard disk 311 of the first PC 31 and the free capacity of the hard disk 321 of the second PC 32 is larger than the file size but each of the free capacity of the hard disk 311 of the first PC 31 and the free capacity of the hard disk 321 of the second PC 32 is smaller than the file size, the downloading operation is impossible. However, according to the above-mentioned method for dividing and storing the file, even in the above-mentioned case, the content can be downloaded.

According to the third embodiment, the description is given of the storage of the downloaded content without compression. However, similarly to the case according to the first embodiment, the downloaded content can be compressed and stored. In this case, in step S30, the first PC 31 sequentially stores the reception data in the temporary memory provided in the first PC 31 while displaying the reception data on the display and compressing the data. With the above-mentioned structure, if the content has a file size larger than each of the free capacities of the hard disk of the first PC 31 and the hard disk of the second PC 32, the content can be downloaded and stored.

According to the embodiments described above, not only the above-mentioned content but also the content associated with content on the homepage can be downloaded. With the above-mentioned structure, advantageously, the user can also view information associated with the content and therefore the user can promptly view a series of associated information.

As mentioned above, according to the embodiments, the home system 30 has two PCs and the downloaded content is divided into two sections, is distributed to two places, and is stored. However, the home system 30 may include three or more PCs. The downloaded content may be divided into three sections, may be distributed to three or more places, and may be stored.

Further, in the embodiments, the mobile terminal 20 can be replaced by a PC. In this case, the downloading operation can be instructed from away from home. The status information indicating the current status of the home system 30 is sent to the PC as homepage information.

As described in detail above, according to the present invention, the content obtaining system for storing the desired content from the Internet without fail can be provided.

While this invention has been described in connection with the preferred embodiments described above, it will now be possible for those skilled in the art to put this invention into practice in various other manners.

What is claimed is:

1. A content obtaining system comprising:
    a communication network;
    a first server which stores content;
    an information processing system;
    a terminal remote from said first server and remote from said information processing system,
    said information processing system and said terminal being separately and independently connected to the communication network,
    said terminal, independently from said information processing system, i) accessing said first server via said communication network and, ii) after said accessing, under a user's operation, transmitting a command, via said communication network, instructing the information processing system to download specific content from said first server, wherein,
    said information processing system receives said command, via said communication network, and automatically downloads, via said communication network, the specific content stored in said first server and designated by said received command.

2. The content obtaining system of claim 1, further comprising:
a second server on said communication network which receives said command from said terminal via said communication network and stores said command;
wherein said information processing system receives said command from said second server.

3. The content obtaining system of claim 2, wherein said information processing system periodically accesses said second server to check whether said command is present.

4. The content obtaining system of claim 1, wherein said information processing system comprises a first information processing device and a second information processing device, wherein said first information processing devices comprises a storage checking unit which checks a free storage capacity of each of said first and second information processing devices, and wherein said content is downloaded in said second information processing device if said storage checking unit determines that there is not enough storage capacity for said content in said first information processing device.

5. The content obtaining system of claim 1, wherein said information processing system compresses said content while downloading said content.

6. The content obtaining system of claim 1, wherein said information processing system compresses previously-stored while downloading said content.

7. The content obtaining system of claim 1, wherein said information processing system comprises a first information processing device and a second information processing device, wherein said first information processing device comprises a dividing unit which divides said content while downloading said content, and wherein said first information processing device stores one part of said divided content and said second information processing device stores another part of said divided content.

8. The content obtaining system of claim 7, wherein said first information processing device first stores said one part of said content, and wherein said second information processing device start to store said second part of said divided content when said first information processing unit determines that a free storage capacity of said first information processing device achieves a predetermined capacity.

9. The content obtaining system of claim 1, wherein said command includes time information, and wherein said information processing system starts to download at a time designated by said time information.

10. The content obtaining system of claim 1, wherein said information processing system comprises a first information processing device and a second information processing device, wherein said command includes storage information, and wherein said content is stored in said first and/or second information processing devices based on said storage information.

11. The content obtaining system of claim 1, wherein, the communication network is the Internet;
the information processing system is a personal computer and the content is downloaded, from the Internet, onto the personal computer,
the terminal is configured for the user to browse, via the Internet, a homepage of the first server and to obtain Uniform Resource Locators of the homepage and of the content to be downloaded, the command comprises the obtained Uniform Resource Locators and the command is transmitted by the terminal under the user's operation and received by the personal computer via the Internet so that said received command causes said personal computer to automatically download the content stored in said first server as designated by said command.

12. The communication terminal of claim 11, wherein,
said personal computer is part of a home computer network comprising a router, and said personal computer is connected to the Internet via the router,
said second server is an Internet Service Provider server,
said second server, upon receiving said command from said terminal via the Internet, stores said command in an area for temporary storage of information from the user, said command further comprising storage information indicating a size of a file to be downloaded by the personal computer and designating a hard disk of the personal computer to which the file is to be downloaded,
said second server responses to a periodic inquiry from said personal computer by sending, over the Internet, said stored command to said personal computer, said inquiry asking for any commands sent from said terminal and stored on said second server,
said terminal connects directly to the Internet by radio signal for accessing said first server, and
said terminal is configured to communicate via the Internet with said home network, said personal computer, with said first server, and with said second server.

13. The communication terminal of claim 12, wherein,
said home network comprises an additional personal computer, and
said terminal is configured to allow the user to form said command to designate storing the file is to be downloaded either one of the personal computer and the additional personal computer, thus allowing the user to store files of a first content genre on the personal computer and files of a second content genre on the another personal computer.

14. A communication terminal comprising:
a communication unit which accesses a content server connected to the Internet, the communication unit being connected to the Internet at a first Internet connection; and
a transmitting unit which transmits a command to said communication unit based on a prior access of the content server by the transmitting unit;
wherein said command is transmitted from said communication unit to a remote information processing system connected to the Internet at a second Internet connection; and
wherein said information processing system automatically downloads content stored in said content server, responsive to said command.

15. An information processing system comprising:
a communication unit which receives a command generated by a remote terminal under a user's operation via a communication network, and automatically downloads content on said communication network designated by said command; and
a storage unit which stores said content, wherein;
the communication unit and the terminal are independently connected to the communication network, and
the communication unit and the terminal separately connected to the communication network independently of each other.

16. The information processing system of claim 15, further comprising a first information processing device and second information processing device, wherein said first information processing devices comprises a storage checking unit which checks a free storage capacity of each of said first and second information processing devices, and wherein said content is downloaded in said second information processing device if said storage checking unit determines that there is not enough storage capacity for said content in said first information processing device.

17. The information processing system of claim 15, wherein said information processing system compresses said content while downloading said content.

18. The information processing system of claim 15, wherein said information processing system compresses previously-stored data while downloading said content.

19. The information processing system of claim 15, further comprising a first information processing device and a second information processing device, wherein said first information processing devices comprises a dividing unit which divides said content while downloading said content, and wherein said first information processing device stores one part of said divided content and said second information processing device stores another part of said divided content.

20. The information processing system of claim 19, wherein said first information processing device begins to store said content, and wherein said second information processing device commences storing said divided content when said first information processing unit determines that a free storage capacity of said first information processing device drops below a predetermined capacity.

21. The information processing system of claim 15, wherein said command includes time information, and wherein said information processing system starts to download at a time designated by said time information.

22. The information processing system of claim 15, further comprising a first information processing device and a second information processing device, wherein said command includes storage information, and wherein said content is stored in said first and/or second information processing devices based on said storage information.

* * * * *